June 1, 1937.  F. C. ZOLLER  2,082,475

HALF-TONE SCREEN AND METHOD OF MANUFACTURE THEREOF

Filed Sept. 18, 1936

INVENTOR.
FRANK C. ZOLLER
BY
Richey & Watts
ATTORNEYS

Patented June 1, 1937

2,082,475

UNITED STATES PATENT OFFICE 2,082,475

HALF-TONE SCREEN AND METHOD OF MANUFACTURE THEREOF

Frank C. Zoller, Cleveland, Ohio

Application September 18, 1936, Serial No. 101,470

8 Claims. (Cl. 95—81)

This invention relates to improvements in half-tone screens for photo-engraved plates and to the method of producing such screens.

The ruled screen in a camera for the purpose of breaking up the continuous tones in a photograph has been in use for many years. The pioneer workers in the art employed a so-called single-line screen, that is a single transparent plate formed with parallel lines ruled upon one face thereof, and the photoengravers were supposed to have turned such screens through an angle of 45° during exposure to secure a cross-line effect upon the negative. Following these efforts the double plate engraved line screen was developed and is now employed as the standard. This screen differed from those previously used in that the lines therein were etched into the glass and two such plates were cemented together with the lines disposed in angular relation. Although modifications of this type of screen have been proposed from time to time no improvement has been offered which has met with commercial acceptance. The improvements proposed included the wavy-line screen and the Metzograph plate, the former comprised a screen with non-lineal rulings, while the latter embodied a plate with an opaque surface formed with series of small lenticular cavities therein.

These screens were found objectionable due to the loss of outline and graduation in transcripts made therefrom, and also because the screens were difficult to manufacture and were costly.

The cross-line screens in use today are also objectionable from the standpoint of economy of manufacture and loss of definition in the transcript. In the plate made therefrom the dots bordering areas of slight tone contrast are fringed or pointed as the result of the geometric linearion of the screen and in areas of sharp tone contrast the dots are rectilinear and form a straight sided geometric figure. In coarse or low rulings the imagery of curved lines, sharp angles and fine delineation is very apparent and may be readily recognized by inspection of a transcript of a circle where the geometric rulings result in a polygonal figure which approximate the subject only as to general configuration and size; also the transcript of acute angles where the loss of detail will be recognized at the vertices of such angles. The proofs taken from such transcripts magnify the deformation of imagery since the ink upon the blocks made therefrom has a tendency to follow and over-run the points and lines extending from the dots, and to unite contiguous dots which if separated would produce a more optically perfect reproduction.

In the screen embodying the present invention the engraving is irregular, both as to direction of lineation and line value; that is the line rulings vary in width and depth and are of vermiculated tracery. Thus the monotony of the geometrical form and arrangement of the rulings is avoided and the inaccuracy of imagery, imperfection of graduation, and loss of definition is eliminated. Moreover, the transcripts made from the improved screen possess a greater depth of perspective, sharper lineation of outline and finer grain texture of the transcript than that afforded by use of other types of screens because the improved screen affords sharp delineation of outline in areas of contrast and prevents the over-run of ink in zones of heavy shade or deep tone values.

In addition to the foregoing objects and advantages, the screen embodying the present invention can be produced at a much lower cost and with greater expedition than the cross-line screens now in use.

Other objects and advantages more or less ancillary to the foregoing and the manner in which all the various objects are attained, will appear from the following description wherein the preferred embodiment of the invention is set forth.

Referring to the drawing.

Figure 1:
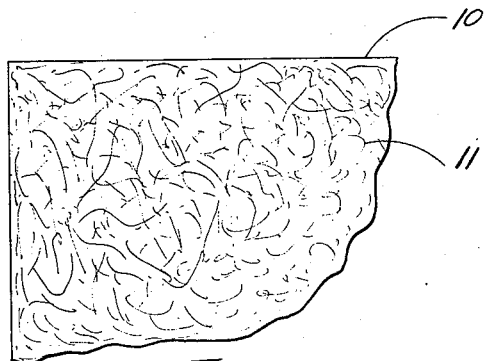
Fig. 1 is a plan view of a fragmentary portion of a screen embodying the present invention, the etching thereon being magnified to illustrate the lineation thereof.

As illustrated in Fig. 1, the plate 10 comprises a sheet of glass, celluloid, or any other suitable grain-free material, the engraving thereon being indicated by the vermiculated tracery 11 which is cut upon a face thereof by comminuted emery, carborundum, or a like abrasive capable of cutting or scratching the surface of the plate.

Figure 3:
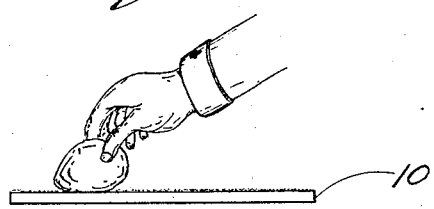
Fig. 3 is a diagrammatic view of a plate shown in end elevation and illustrating one of the methods by which the plate may be engraved.

The preferred method of manufacture of the screen is effected by coating a fabric or fibrous pad with dry powdered abrasive, pressing the pad firmly upon the surface of the transparent material or plate to be etched, then rubbing the surface of the plate preferably with an oscillatory movement until the abrasive has scratched or cut the surface of the transparent material to the desired depth. As illustrated in Fig. 3, the plates may be made by using a cotton pad coated with emery flour, then with a circular motion manually rubbing or scouring the plate until the surface thereof is formed or engraved with a myriad of truncated prisms or cones thereon. In this step of manufacture it is to be understood that the invention contemplates the use of such mechanical expedients as would be necessary and suitable to attain the above results and such expedients, the use and function thereof, are deemed as falling within the scope and spirit of the invention.

Figure 2:
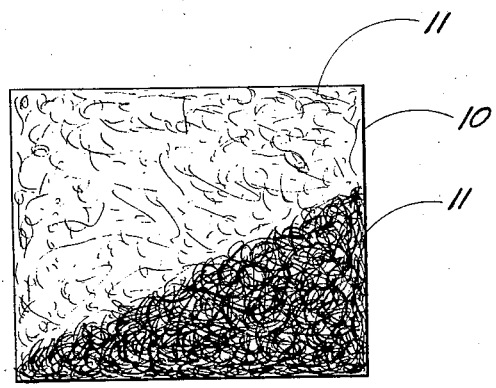
Fig. 2 is a plan view of a plate made in accordance with the invention and illustrating in the lower portion thereof a more heavily engraved area provided to compensate or correct the tone values of the photographic subject.

As illustrated in Fig. 2, the engraving may be intensified, if desired, in localized areas of the plate in order to eliminate tone defects occurring in the subject, such for instance as halation, refraction, and light intensification in localized areas of the subject.

In the exercise of the foregoing step of manufacture, variations of tone of the transcripts may be obtained by the grain size of the abrasive employed. For example, in the preparation of screens for the production of half-tones to be used with a sized paper stock, a fine emery flour may be employed. Transcripts prepared in this manner excel the work produced from cross line screen of the finest ruling. In screens prepared for the production of plates to be used in making mats or matrices or half-tones to be used with rough paper stock such as newspaper, a coarser grain abrasive may be used and the engraving may be prepared with tracery which is comparable to that of low ruling cross line screens.

As the surface of the transparent material is cut or engraved pyremedial projections are formed between the points at which the inscribed lines cross and recross each other, the proximity of the points thus formed depending upon the degree of cross cutting or engraving and the manner of application of the abrasive upon the surface of the plate. After the plate is engraved the surface thereof is coated with an opaque material such for instance as India ink which is permitted to become partially dried, then wiped off with a swab so that the intaglio will remain filled with the opaque material, while the high points or crests of the pyremedial projections in the plate will remain transparent. After the opaque pigments are thoroughly dry the screen may be used in the manner customarily employed. The transcripts resulting from screens prepared in the above manner are of sharper outline since the dots on the block prepared therefrom are non-geometric and the ink applied thereon has no opportunity to flow beyond the dots formed thereby. Moreover the texture of the transcript is softer and the depth of perspective appears greater since the dots in the plate are unbiased or non-geometric.

The screen embodying the present invention is more economic of manufacture than the engraved cross line screens now in use since such screens entail the use of engraving machines which are slow of action, and costly of operation. Moreover, the double plate cross line screen requires constant maintenance expense and care as the plates must frequently be separated, cleaned and re-cemented.

Although the foregoing description is necessarily of a detailed character, in order that the invention may be completely set forth, it is to be understood that the specific terminology is not intended to be restrictive or confining, and the various rearrangements of parts and modifications of detail may be resorted to without departing from the scope or spirit of the invention as herein claimed.

I claim:
1. The method of making a half-tone screen comprising engraving a transparent plate by rubbing an abrasive in a circular movement over the surface thereof, coating the surface so engraved with an opaque material, permitting said opaque material to partially dry, then removing the opaque material from unetched portions of the plate, but allowing the opaque material to remain within the etched lines.

2. The method of making a half-tone screen comprising coating a fabric with powdered emery, rubbing with a circular movement the surface of a transparent plate, thus scratching overlapped arcuate lines upon the surface thereof, coating the surface so treated with an opaque material, permitting said opaque material to become partially dried, removing said opaque material from the surface of the plate, but leaving said opaque material within said scratched arcuate lines.

3. The method of making a half-tone screen comprising coating a fabric with powdered emery, rubbing with a circular movement the surface of a transparent plate, thus scratching overlapped arcuate lines upon the surface thereof, applying India ink upon the surface so treated, permitting said ink to be partially dried, then rubbing off said ink from the unscratched surface of the plate while permitting the scratched lines to remain filled therewith.

4. A half-tone screen comprising a transparent plate, irregular overlapped arcuate engravings upon a surface thereof, said engravings being filled with an opaque material.

5. A photo-engraving screen for making half-tones and the like comprising a transparent plate, an abraded surface thereon made by rubbing an abrasive in a circular overlapped movement thereover, and an opaque material in the abraded cavities of said plate.

6. A screen for making half-tones comprising a transparent plate overlapping vermiculated scratches upon a surface thereof, and an opaque material with the crevices of said scratches.

7. A screen for making half-tones comprising a transparent plate, vermiculated intaglio engravings upon a surface thereof formed by non-lineal movement of an abrasive ladened pad over the surface thereof, and an opaque material within said engraving.

8. The method of making a half-tone screen comprising scratching the surface of a transparent plate in overlapped vermicular tracery, and filling said scratches with an opaque material.

FRANK C. ZOLLER.